United States Patent [19]

Liszka et al.

[11] Patent Number: 4,989,159
[45] Date of Patent: Jan. 29, 1991

[54] MACHINE MONITORING METHOD

[76] Inventors: Ludwik Liszka; Jan Liszka-Hackzell, both of Parkvägen 4- S-910 36, Sävar, Sweden

[21] Appl. No.: 311,490

[22] Filed: Feb. 15, 1989

[30] Foreign Application Priority Data

Oct. 13, 1988 [SE] Sweden .............................. 8803658-7

[51] Int. Cl.⁵ ............................................. G01M 7/00
[52] U.S. Cl. .................................... 364/508; 73/660; 364/581
[58] Field of Search ............... 364/505, 506, 507, 508, 364/554, 581, 550, 551.01, 485; 73/658, 659, 660; 382/30

[56] References Cited

U.S. PATENT DOCUMENTS

| | | | |
|---|---|---|---|
| 4,402,054 | 8/1983 | Osborne et al. | 364/554 |
| 4,408,294 | 10/1983 | Imam | 364/508 |
| 4,425,798 | 1/1984 | Nagai et al. | 364/508 |
| 4,435,770 | 3/1984 | Shiohata et al. | 364/508 |
| 4,453,407 | 6/1984 | Sato et al. | 364/508 |
| 4,485,678 | 12/1984 | Fanuele | 364/508 |
| 4,559,828 | 12/1985 | Liszka | 73/658 |
| 4,758,964 | 7/1988 | Bittner et al. | 364/506 |
| 4,817,176 | 3/1989 | Marshall et al. | 382/43 |

Primary Examiner—Parshotam S. Lall
Assistant Examiner—Michael Zanelli
Attorney, Agent, or Firm—Pollock, Vande Sande & Priddy

[57] ABSTRACT

Method of monitoring the operational state of a machine, particularly one having two mutually co-acting rotating machine parts operating at different revolutionary rates. Sensed vibration spectra are compared with theoretically calculated spectra and the peaks in the respective spectra are mutually matched. Each match or assignation is alloted an adjustment weight, which is specific for a given machine part and which increases with the amplitude of the peak and decreases with the frequency distance between the peaks. The adjustment weights are summed into weights which are attributable to the respective machine part. The part weights form weight vectors, and a reference class is formed on the basis of a plurality of weight vectors obtained during normal operation. Each new weight vector is compared with the reference class, and it is then determined whether the difference exceeds a predetermined statistical spread value.

6 Claims, 2 Drawing Sheets

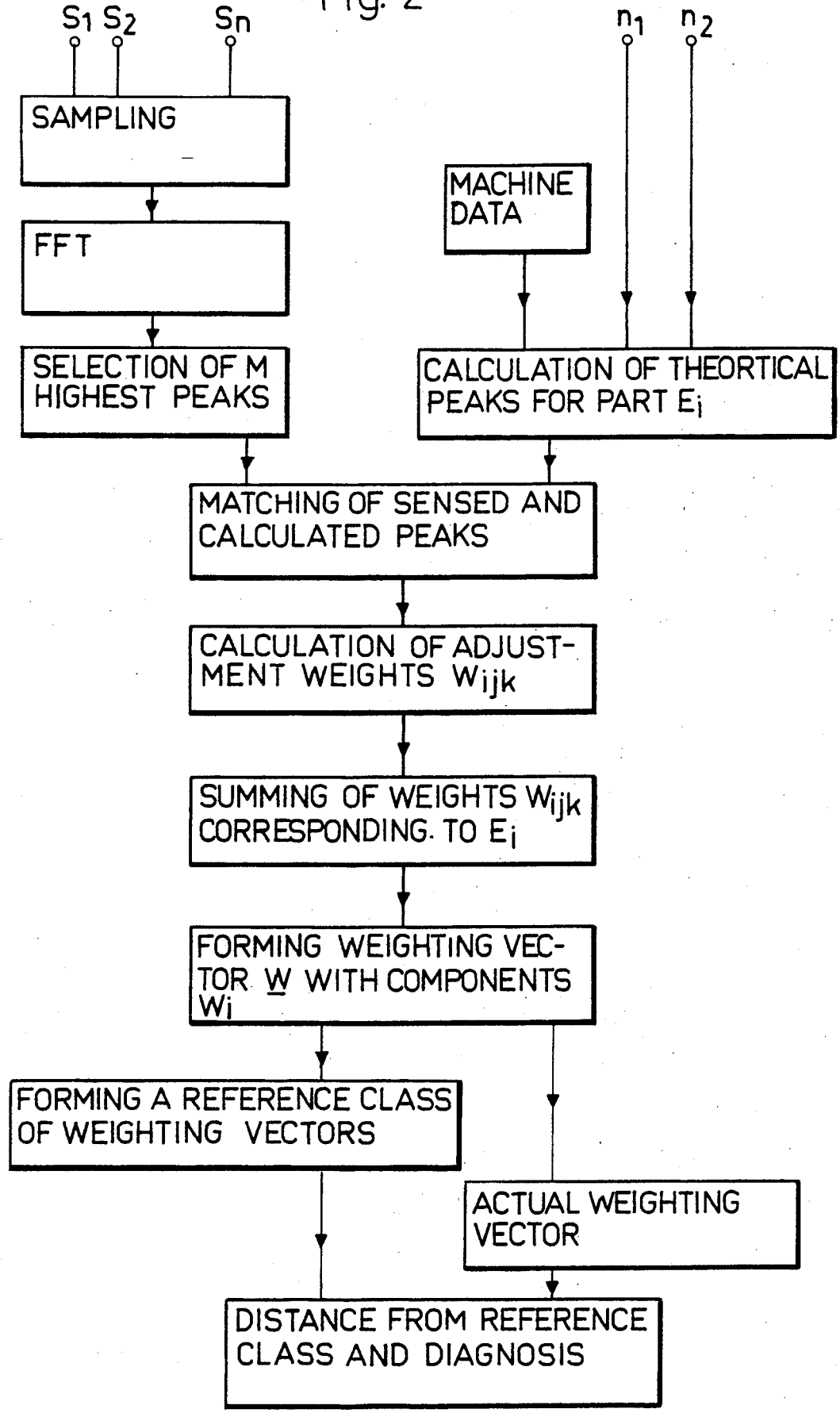

MACHINE MONITORING METHOD

FIELD OF THE INVENTION

The invention relates to a method of continuously monitoring the operational state of a machine, particularly a complicated machine with at least two rotating machine parts, working at different revolutionary rates and in mutual co-action, sensed vibration states being processed by analysis of frequency spectra while utilizing sampling and pattern recognition techniques, and abnormal operational conditions being detected by calculating the probability of a sensed vibration state differing significantly from normal operational states, which are represented by a reference class calculated on the basis of previously sensed vibration states during normal operation of the machine.

BACKGROUND OF THE INVENTION

Such a method is already known from EP-A-84902732.1, where the U.S. Pat. No. 4,559,828 reference class comprises frequency spectra and where pattern recognition and detection means are adapted for calculating the probability, for each new frequency spectrum, that the latter is associated with a class other than the reference class, whereby an abnormal operational state of the machine is detected when this probability exceeds a predetermined limit.

The known method is advantageous in that no interpretation of frequency spectra needs to be made as long as each sensed frequency spectrum belongs to the reference class. Only when abnormal operational states occur does the frequency spectrum need to be studied more closely. For simple machines, each peak in the spectrum can be attributed to a given function or to a given machine part, and even very small functional changes can thus be discovered at an early stage.

In more complicated machines with at least two rotating machine parts operating at different revolutionary rates and in mutual co-action, particularly via different mechanisms, as is the case in jet engines, the known method cannot be used without complications. Accordingly, each spectrum peak must be analyzed with relation to its origin. This is complicated, and in addition is not always possible, since different machine parts in certain combinations of revolutionary rates can give rise to coinciding spectrum peaks.

SUMMARY OF THE INVENTION

Against this background the object of the present invention is to develop the known method such that monitoring will also be reliable, and the diagnosis of functional disturbances will be possible, for complicated machines of the kind indicated above.

This object is achieved as follows in accordance with the invention. The principle of directly applying pattern sensing techniques to sensed vibration spectra and their peaks is abandoned. Instead, a mutual adjustment of the peaks in sensed and theoretically calculated spectra is carried out for the purpose of forming so-called weighting vectors, the components of which are directly assignable to different machine parts or partial systems in the machine. Accordingly, a transformation from vibration spectra to such weighting vectors takes place before a statistical model is constructed and comparison between new and earlier states takes place.

In detecting an abnormal operational state, a fault diagnosis can be made in a simple way, since deviating components in the weighting vector can be directly identified and related to specific machine parts or partial systems in the machine.

BRIEF DESCRIPTION OF THE DRAWINGS

The invention will now be described in more detail, and with reference to the accompanying drawings, which illustrate a preferred embodiment.

FIG. 2 is a block diagram of the essential steps in the method in accordance with the invention.

DESCRIPTION OF THE PREFERRED EMBODIMENT

Figure 1:
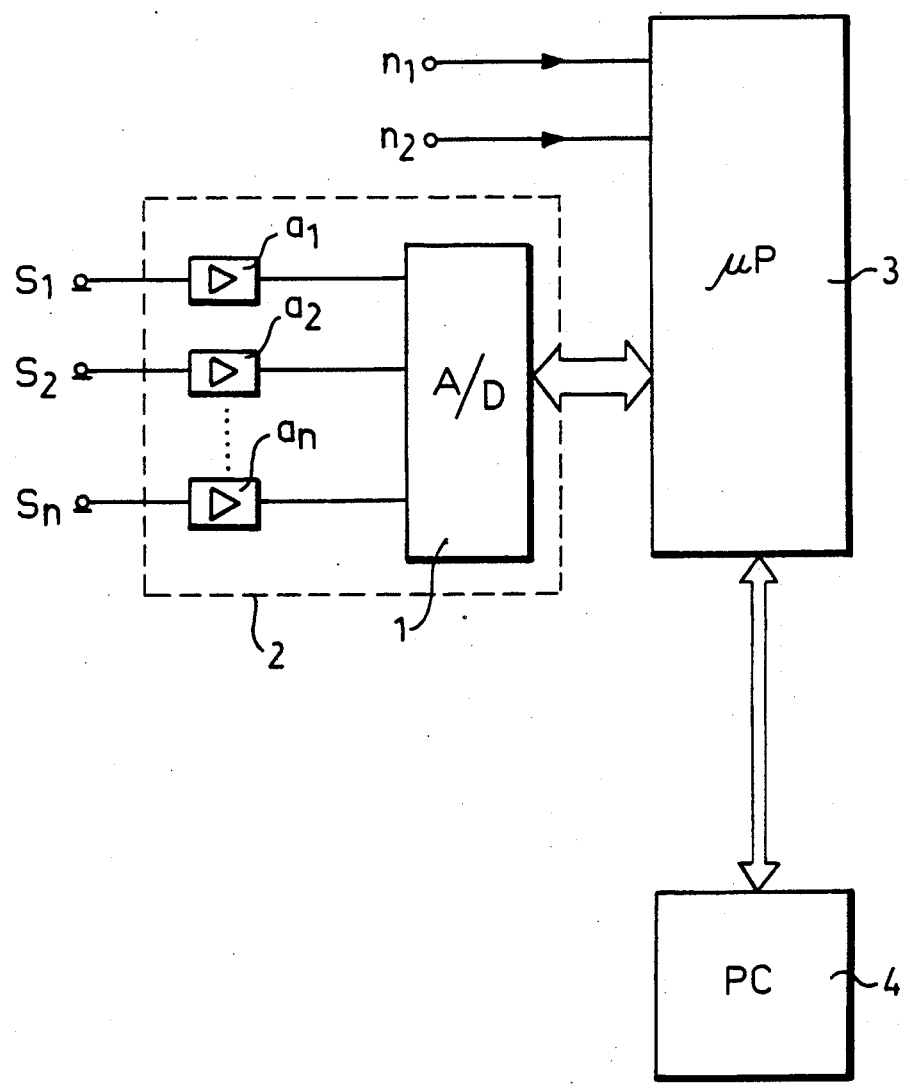
FIG. 1 schematically illustrates a measuring system with associated computer equipment for using the method in accordance with the invention.

FIG. 1 illustrates, much simplified, a plurality of vibration sensing sensors $s_1, s_2, \ldots, s_n$, which are disposed on different parts of an unillustrated machine, and in this case the machine is assumed to include two rotating machine parts (shafts) operating at mutually different revolutionary rates $n_1$ and $n_2$. In addition to the sensors $s_1, s_2, \ldots, s_n$ the measuring system also includes two transducers for measuring the rates $n_1$ and $n_2$.

As described in more detail in the above-mentioned EP-A-84902732.1, the vibration sensors are each coupled to an amplifier $a_1, a_2, \ldots, a_n$, which in turn is connected, possibly via an unillustrated filter, to a separate input on an A/D converter 1, forming together with the amplifiers a sampling means 2. The signals from the sensors $s_1, s_2, \ldots, s_n$ are sampled under the control of a microprocessor 3, which is also directly connected to the transducer for the revolutionary rates $n_1$ and $n_2$, the signals also being amplified and digitized to form time series, which are transmitted together with the revolutionary rate signals to a monitoring computer 4, e.g., a personal computer, for further processing and analysis. The computer 4 and microprocessor 3 are mutually connected for data transmission and control in both directions in the manner described in the above-mentioned EP publication, possibly via a remote communication link. In a special application of the invention, the machine comprises an aircraft jet engine, however, the sampling means 2 and microprocessor 3 then being placed close to the engine, while the monitoring computer 4 is centrally placed in the aircraft cockpit. Alternatively, the jet engine can be ground-tested, when ground tests are being performed on the engine, the computer equipment then being placed outside the aircraft.

Signal processing is carried out in accordance with the block diagram of FIG. 2. After sampling the vibration signals from the sensors $s_1, s_2, \ldots, s_n$, each time series transmitted to the computer 4 is converted by a Fourier transform (FFT) into a frequency spectrum (in the form of a table with levels and frequencies). A predetermined number M of the highest peaks are selected in this frequency spectrum.

In accordance with the invention, these sensed spectrum peaks are compared with pre-calculated theoretical peaks associated with the respective machine part or partial system in the machine. During this calculation it is assumed that each machine part $E_i$, with the intermediary of the respective mechanism $M_j$, generates a plurality of spectrum peaks $N_{ijk}$ with frequencies $F_{ijk}$, the latter being dependent of the revolutionary rates. The sub-index k refers here to the respective harmonic. The revolutionary rates $n_1$ and $n_2$ sensed by the transducers in the particular case are used in the calculation. The total number (N) of peaks in the theoretically calculated vibration spectrum is thus:

$$N = \sum_i \sum_j \sum_k N_{ijk}$$

In certain combinations of revolutionary rates, it can occur that two or more of the theoretically calculated peaks are at the same frequency, but this relationship is accidental and disappears when the revolutionary rate relationship changes.

Each of the M selected peaks in a sensed, actual frequency spectrum is compared with the theoretically calculated peaks in the appropriate frequency range associated with the respective machine part. For each machine part $E_i$, the true and theoretically calculated peaks are matched with each other, i.e., each actual peak is assigned one or more adjacent, theoretically calculated peaks. For each such match or assignment, the computer calculates an adjustment weight $w_{ijk}$, which is proportional to the height of the actual peak above the background level and is inversely proportional to the frequency distance between both peaks (the actual and the theoretically calculated).

For the machine part $E_i$, under discussion, the different adjustment weights $w_{ijk}$ are summed to form a part weight (the total weights for the part) associated with the respective machine part, as follows:

$$W_i = \sum_j \sum_k w_{ijk}$$

the process is then repeated for remaining machine parts $E_i$ and their associated part weight $W_i$ are formed, which together form a weight vector associated with the machine in its entirety,:

$$W = (W_1, W_2, \ldots, W_n)$$

The components of which constitute a measure of the respective machine part contribution to the vibration spectrum.

To describe different parts of the machine or its different functions, e.g., phenomena related to revolutionary rate or gear tooth mesh, measurements are sometimes required within different frequency ranges. The part weights built up from spectra within different frequency ranges can be combined while taking into account the resolution in the respective spectrum. The high-resolution spectra are here given greater weight, e.g., the part weights can be summed after multiplication, each with a factor 1/B, where B is the bandwidth corresponding to the resolution in the respective spectrum.

The weight vectors calculated are used in the same way as the vibration spectra in the method according to the above-mentioned EP publication. Accordingly, a special pattern recognition program (SIMCA or the like specially adapted program) is used for forming a statistical model of the normal machine function, namely, in the form of a reference class. During continuous monitoring of the machine, each new weight vector is compared (one for each spectrum or group of spectra within different frequency ranges) with the reference class. The distance from the reference class, expressed in a statistical spread value, decides whether the operational state under consideration differs significantly from the normal state.

In this way, abnormal operational states can be detected with great reliability, even for comparatively minor functional disturbances. Since the components (the part weights) of the weight vectors have a direct relationship with specific machine parts, a fault diagnosis can easily be made.

The method in accordance with the invention can of course be applied to comparatively simple machines, e.g., those with only one basic revolutionary rate. In such application also, there greater reliability and simpler diagnosis of possible operational disturbances are achieved.

We claim:

1. A method of continuously monitoring the operational state of a machine, particularly a complicated machine with at least two rotating parts, working at different revolutionary rates and in mutual co-action, sensed vibration states being processed by analysis of frequency spectra while utilizing sampling and pattern recognition techniques, abnormal operational conditions being detected by calculating the probability of a sensed vibration state differing significantly from normal operational states, which are represented by a reference class calculated on the basis of previously sensed vibration states during normal operation of the machine, said method comprising the steps of:
    (a) calculating expected peaks in a vibration spectrum theoretically for each vibration-generating machine part or partial system in the machine and the occurring revolutionary rates;
    (b) selecting a plurality of peaks in the respective vibration spectrum during continuous sensing of the actual vibration states;
    (c) matching at least one of said expected peaks to each selected actual peak, and assigning to each such match an adjustment weight, which increases with the amplitude of the actual peak and decreases with the frequency distance between the actual and its matched calculated peak;
    (d) summing all adjusting weights associated with a given machine part or partial system to form a part weight;
    (e) forming a weight vector corresponding to the machine in its entirety, the components of this vector comprising said part weights; and,
    (f) forming said reference class on the basis of a plurality of weight vectors, each new weight vector being compared with said reference class, whereupon it is determined whether the difference exceeds a predetermined statistical spread value.

2. A method as claimed in claim 1, wherein said adjustment weight is substantially proportional to a height of the actual peak above a background level and substantially inversely proportional to said frequency distance.

3. A method as claimed in claim 1, wherein separate measurements are made within different frequency ranges, the part weights originating from these different frequency ranges being mutually combined while taking into account the resolution in the respective frequency range.

4. A method as claimed in claim 3, wherein part weights originating from the frequency ranges with relatively high resolution are given a greater share in the respective combined weight than part weights originating from frequency ranges with relatively low resolution.

5. A method as claimed in claim 4, wherein the part weights originating from different frequency ranges are combined by summing after multiplication of each part weight by a factor 1/B, where B is the bandwidth corresponding to the resolution in the respective frequency range.

6. A method as claimed in any one of claims 1 to 5, wherein in detecting an abnormal operational state, a fault diagnosis is made by determined what part weights in the weight vector in question substantially contribute to the statistical deviation, these part weights or partial vectors being attributable to individual machine parts or partial systems in the machine.

* * * * *